(12) United States Patent
Shepherd et al.

(10) Patent No.: US 11,556,373 B2
(45) Date of Patent: Jan. 17, 2023

(54) POD DEPLOYMENT IN A GUEST CLUSTER EXECUTING AS A VIRTUAL EXTENSION OF MANAGEMENT CLUSTER IN A VIRTUALIZED COMPUTING SYSTEM

(71) Applicant: VMware, Inc., Palo Alto, CA (US)

(72) Inventors: Zachary James Shepherd, San Francisco, CA (US); Derek William Beard, Austin, TX (US); Mark Russell Johnson, McKinleyville, CA (US)

(73) Assignee: VMware, Inc., Palo Alto, CA (US)

( * ) Notice: Subject to any disclaimer, the term of this patent is extended or adjusted under 35 U.S.C. 154(b) by 136 days.

(21) Appl. No.: 16/924,719

(22) Filed: Jul. 9, 2020

(65) Prior Publication Data

US 2022/0012080 A1 Jan. 13, 2022

(51) Int. Cl.
*G06F 9/455* (2018.01)
*G06F 9/445* (2018.01)

(52) U.S. Cl.
CPC ...... *G06F 9/45558* (2013.01); *G06F 9/44505* (2013.01); *G06F 9/45545* (2013.01); *G06F 2009/45562* (2013.01); *G06F 2009/45595* (2013.01)

(58) Field of Classification Search
CPC ............. G06F 9/45558; G06F 9/44505; G06F 9/45545; G06F 2009/45562; G06F 2009/45595
See application file for complete search history.

(56) References Cited

U.S. PATENT DOCUMENTS

| | | | |
|---|---|---|---|
| 10,191,778 B1 * | 1/2019 | Yang | G06Q 30/0635 |
| 10,762,049 B1 * | 9/2020 | Liang | G06F 11/323 |
| 2017/0371693 A1 | 12/2017 | Corrie et al. | |
| 2020/0356397 A1 * | 11/2020 | Kumatagi | G06F 9/455 |

OTHER PUBLICATIONS

Navin Sabbarwal; Pro Google Kubernetes Engine; 2020 (Year: 2020).*
Ernst, E. et al. "Kata Containers Architecture," GitHub, Inc., 2019, 22 pages, URL: https://github.com/kata-containers/documentation/blob/master/design/architecture.md.
Kubernetes, "The Cluster API Book," v1alpha2, 2019, pp. 11-45, URL: https://release-0-2.cluster.api.sigs.k8s.io/print.html.

(Continued)

*Primary Examiner* — Dong U Kim
(74) *Attorney, Agent, or Firm* — Kim & Stewart LLP

(57) ABSTRACT

An example virtualized computing system includes a host cluster having hosts and a virtualization layer executing on hardware platforms of the hosts, the virtualization layer supporting execution of virtual machines (VMs), the VMs including pod VMs, the pod VMs including container engines supporting execution of containers in the pod VMs; and an orchestration control plane integrated with the virtualization layer, the orchestration control plane including a master server configured to manage the pod VMs and first VMs of the VMs. The virtualized computing system further includes a guest cluster executing in the first VMs and managed by the orchestration control plane, the guest cluster including a guest master server configured to, in cooperation with the master server, deploy first pods in the pod VMs.

20 Claims, 8 Drawing Sheets

(56) References Cited

OTHER PUBLICATIONS

Kubernetes, "The Cluster API Book," v1alpha3, Date Unknown, 206 pages, retrieved Jul. 31, 2020, URL: https://cluster-api.sigs k8s.io/print.html.
Lipovetsky, D. "Cluster API v1alpha3 Delivers New Features and an Improved User Experience," Kubernetes Blog, Apr. 21, 2020, 6 pages, URL: https://kubernetes.io/blog/2020/04/21/cluster-api-v1alpha3-delivers-new-features-and-an-improved-user-experience/.
VMware, Inc. "Overview of vSphere Integrated Containers," Product version: 1.5, 2019, 21 pages.
U.S. Appl. No. 16/751,529, filed Jan. 24, 2020, 48 pages.

\* cited by examiner

POD DEPLOYMENT IN A GUEST CLUSTER EXECUTING AS A VIRTUAL EXTENSION OF MANAGEMENT CLUSTER IN A VIRTUALIZED COMPUTING SYSTEM

Applications today are deployed onto a combination of virtual machines (VMs), containers, application services, and more. For deploying such applications, a container orchestration platform known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into a logical unit called a "pod." Containers in the same pod share the same resources and network and maintain a degree of isolation from containers in other pods. The pods are distributed across nodes of the Kubernetes system and an image cache is provided on each node to speed up pod deployment. A node includes an operating system (OS), such as Linux®, and a container engine executing on top of the OS that supports the containers of the pod. Kubernetes control plane components (e.g., a kubelet) execute on the OS alongside the containers. Thus, a node includes multiple containers and control plane components executing on a shared OS.

Kubernetes nodes can be implemented using host operating systems executing on server-grade hardware platforms or using guest operating systems executing in virtual machines (VMs). A virtualized computing system, for example, can be complex involving clusters of virtualized hosts and associated management systems. Application developers are focused on developing applications for execution in a Kubernetes system and typically do not have expertise in managing the Kubernetes system itself. A developer/operator engineer can have expertise in infrastructure and application platforms in order to manage a Kubernetes cluster, but typically does not have expertise in managing complex virtualized infrastructure. A virtualized infrastructure (VI) administrator can have expertise in managing various on-premises, cloud, and hybrid virtualized infrastructures, but may not have the skills or experience to manage Kubernetes clusters and applications. Accordingly, it is desirable to provide a system that logically separates virtualized infrastructure management, cluster management, and application development.

SUMMARY

In an embodiment, a virtualized computing system includes a host cluster having hosts and a virtualization layer executing on hardware platforms of the hosts, the virtualization layer supporting execution of virtual machines (VMs), the VMs including pod VMs, the pod VMs including container engines supporting execution of containers in the pod VMs; and an orchestration control plane integrated with the virtualization layer, the orchestration control plane including a master server configured to manage the pod VMs and first VMs of the VMs. The virtualized computing system further includes a guest cluster executing in the first VMs and managed by the orchestration control plane, the guest cluster including a guest master server configured to, in cooperation with the master server, deploy first pods in the pod VMs.

In an embodiment, a method of deploying first pods in a virtualized computing system is described. The virtualized computing system includes a host cluster having hosts and a virtualization layer executing on hardware platforms of the hosts, the virtualization layer supporting execution of virtual machines (VMs), the VMs including pod VMs, the pod VMs including container engines supporting execution of containers in the pod VMs. The method includes: receiving a first specification of the first pods at a guest master server of a guest cluster executing in first VMs of the VMs and managed by an orchestration control plane, the orchestration control plane integrated with the virtualization layer and including a master server configured to manage the pod VMs, the first VMs, and the guest cluster; and deploying, by the guest master server in cooperation with the master server, the first pods in the pod VMs.

Further embodiments include a non-transitory computer-readable storage medium comprising instructions that cause a computer system to carry out the above method.

DETAILED DESCRIPTION

Figure 1:
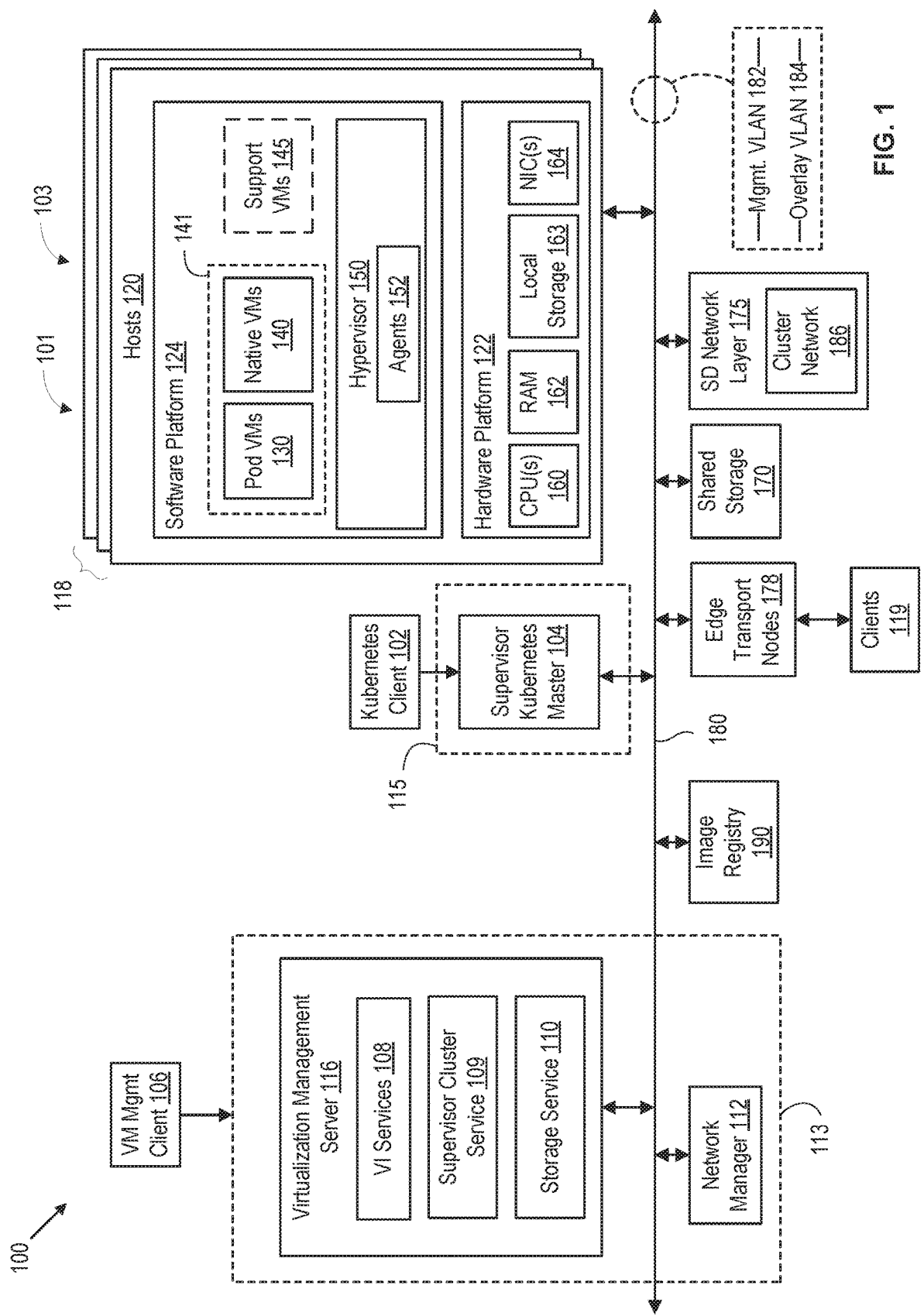
FIG. 1 is a block diagram of a virtualized computing system in which embodiments may be implemented.

Techniques for pod deployment in a guest cluster executing as a virtual extension of a management cluster in a virtualized computing system are described. The virtualized computing system includes a cluster of hosts having a virtualization layer executing on host hardware platforms. The virtualization layer supports execution of virtual machines (VMs). A virtualization management server manages host clusters, the virtualization layers, and the VMs executing thereon. In embodiments, the virtualization layer of a host cluster is integrated with a container orchestration control plane, such as a Kubernetes control plane. This integration provides a "supervisor cluster" (i.e., management cluster) that uses VMs to implement both control plane nodes and compute objects managed by the Kubernetes control plane. For example, Kubernetes pods are implemented as "pod VMs," each of which includes a kernel and container engine that supports execution of containers. The Kubernetes control plane of the supervisor cluster is extended to support VM objects in addition to pods, where the VM objects are implemented using native VMs (as opposed to pod VMs). A virtualization infrastructure administrator (VI admin) can enable a host cluster as a supervisor cluster and provide its functionality to development teams. The VI admin creates "supervisor namespaces" within the supervisor cluster control plane, which provide resource-constrained and authorization-constrained units of multi-tenancy. Development teams deploy their applications within the scope of the supervisor namespaces and subject to their constraints.

As described above, the supervisor cluster control plane is extended to support custom VM objects in addition to pods. In embodiments, the controlled extensibility of the supervisor cluster is leveraged to deliver a "guest cluster" as a custom object. The guest cluster comprises a standard Kubernetes control plane and associated nodes, as well as components for interfacing the underlying supervisor cluster. The guest cluster executes within compute objects of managed by the supervisor cluster (e.g., native VMs or both native VMs and pod VMs) and utilizes networking and storage exposed by the supervisor cluster. In this manner, a guest cluster is a virtual extension of an underlying management cluster (i.e., the supervisor cluster). Guest clusters build on the workload management functionality provided by the supervisor cluster, which provides development teams with familiar control over cluster configuration and cluster lifecycle. Development teams can upgrade guest clusters to maintain aggressive currency with upstream Kubernetes distributions. Guest clusters provide a managed cluster experience to the users, simplifying lifecycle management of Kubernetes clusters. The guest cluster software stack absorbs the complexity of cluster creation, cluster upgrade, cluster integration with the supervisor cluster, and more, to provide a declarative cluster configuration interface to development teams.

In a supervisor cluster, pod VMs provide significant performance and isolation benefits for pod deployment as compared to standard Kubernetes. A guest cluster can execute a standard Kubernetes cluster as an extension of the supervisor cluster. The guest cluster can deploy pods therein, which execute on the native VMs implementing the guest cluster. The pods executing within the guest cluster on the native VMs do not have the same performance and isolation benefits as pod VMs in the supervisor cluster. In embodiments, the guest cluster is configured to deploy at least some pods as pod VMs, rather than as pods within the guest cluster itself. The pod VMs execute alongside the native VMs implementing the guest cluster. This allows for implementation of a standard Kubernetes cluster as a virtual extension of the supervisor cluster, but with some or all pods being implemented by pod VMs, which provide the performance and isolation benefits. These and further advantages and aspects of the disclosed architecture are described below with respect to the drawings.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162, one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, Calif.

In the example of FIG. 1, host cluster 118 is enabled as a "supervisor cluster," described further herein, and thus VMs executing on each host 120 include pod VMs 130 and native VMs 140. A pod VM 130 is a virtual machine that includes a kernel and container engine that supports execution of containers, as well as an agent (referred to as a pod VM agent) that cooperates with a controller of an orchestration control plane 115 executing in hypervisor 150 (referred to as a pod VM controller). An example of pod VM 130 is described further below with respect to FIG. 2. VMs 130/140 support applications 141 deployed onto host cluster 118, which can include containerized applications (e.g., executing in either pod VMs 130 or native VMs 140) and applications executing directly on guest operating systems (non-containerized)(e.g., executing in native VMs 140). One specific application discussed further herein is a guest cluster executing as a virtual extension of a supervisor cluster. Some VMs 130/140, shown as support VMs 145, have specific functions within host cluster 118. For example, support VMs 145 can provide control plane functions, edge transport functions, and the like. An embodiment of software platform 124 is discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs. For example, edge transport nodes 178 can be implemented in support VMs 145 and include a gateway of SD network layer 175. Various clients 119 can access service(s) in virtualized computing system through edge transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualization management server 116 further enables host cluster 118 as a supervisor cluster 101. Virtualization management server 116 installs additional agents 152 in hypervisor 150 to add host 120 to supervisor cluster 101. Supervisor cluster 101 integrates an orchestration control plane 115 with host cluster 118. In embodiments, orchestration control plane 115 includes software components that support a container orchestrator, such as Kubernetes, to deploy and manage applications on host cluster 118. By way of example, a Kubernetes container orchestrator is described herein. In supervisor cluster 101, hosts 120 become nodes of a Kubernetes cluster and pod VMs 130 executing on hosts 120 implement Kubernetes pods. Orchestration control plane 115 includes supervisor Kubernetes master 104 and agents 152 executing in virtualization layer (e.g., hypervisors 150). Supervisor Kubernetes master 104 includes control plane components of Kubernetes, as well as custom controllers, custom plugins, scheduler extender, and the like that extend Kubernetes to interface with virtualization management server 116 and the virtualization layer. For purposes of clarity, supervisor Kubernetes master 104 is shown as a separate logical entity. For practical implementations, supervisor Kubernetes master 104 is implemented as one or more VM(s) 130/140 in host cluster 118. Further, although only one supervisor Kubernetes master 104 is shown, supervisor cluster 101 can include more than one supervisor Kubernetes master 104 in a logical cluster for redundancy and load balancing.

In an embodiment, virtualized computing system 100 further includes a storage service 110 that implements a storage provider in virtualized computing system 100 for container orchestrators. In embodiments, storage service 110 manages lifecycles of storage volumes (e.g., virtual disks) that back persistent volumes used by containerized applications executing in host cluster 118. A container orchestrator such as Kubernetes cooperates with storage service 110 to provide persistent storage for the deployed applications. In the embodiment of FIG. 1, supervisor Kubernetes master 104 cooperates with storage service 110 to deploy and manage persistent storage in the supervisor cluster environment. Other embodiments described below include a vanilla container orchestrator environment and a guest cluster environment. Storage service 110 can execute in virtualization management server 116 as shown or operate independently from virtualization management server 116 (e.g., as an independent physical or virtual server).

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, Calif.

Network manager 112 can deploy one or more transport zones in virtualized computing system 100, including VLAN transport zone(s) and an overlay transport zone. A VLAN transport zone spans a set of hosts 120 (e.g., host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

In an embodiment, system 100 further includes an image registry 190. As described herein, containers of supervisor cluster 101 execute in pod VMs 130. The containers in pod VMs 130 are spun up from container images managed by image registry 190. Image registry 190 manages images and image repositories for use in supplying images for containerized applications. Image registry 190 can execute in one or more VMs 130/140 in host cluster 118.

Virtualization management server 116 and network manager 112 comprise a virtual infrastructure (VI) control plane 113 of virtualized computing system 100. Virtualization management server 116 can include a supervisor cluster service 109, storage service 110, and VI services 108. Supervisor cluster service 109 enables host cluster 118 as supervisor cluster 101 and deploys the components of orchestration control plane 115. VI services 108 include various virtualization management services, such as a distributed resource scheduler (DRS), high-availability (HA) service, single sign-on (SSO) service, virtualization management daemon, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. Kubernetes client 102 can be kubectl for example. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD network layer 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. In this manner, the user interacts with supervisor Kubernetes master 104 to deploy applications in supervisor cluster 101 within defined supervisor namespaces. While FIG. 1 shows an example of a supervisor cluster 101, the techniques described herein do not require a supervisor cluster 101. In some embodiments, host cluster 118 is not enabled as a supervisor cluster 101. In such case, supervisor Kubernetes master 104, Kubernetes client 102, pod VMs 130, supervisor cluster service 109, and image registry 190 can be omitted. While host cluster 118 is show as being enabled as a transport node cluster 103, in other embodiments network manager 112 can be omitted. In such case, virtualization management server 116 functions to configure SD network layer 175.

Figure 2:
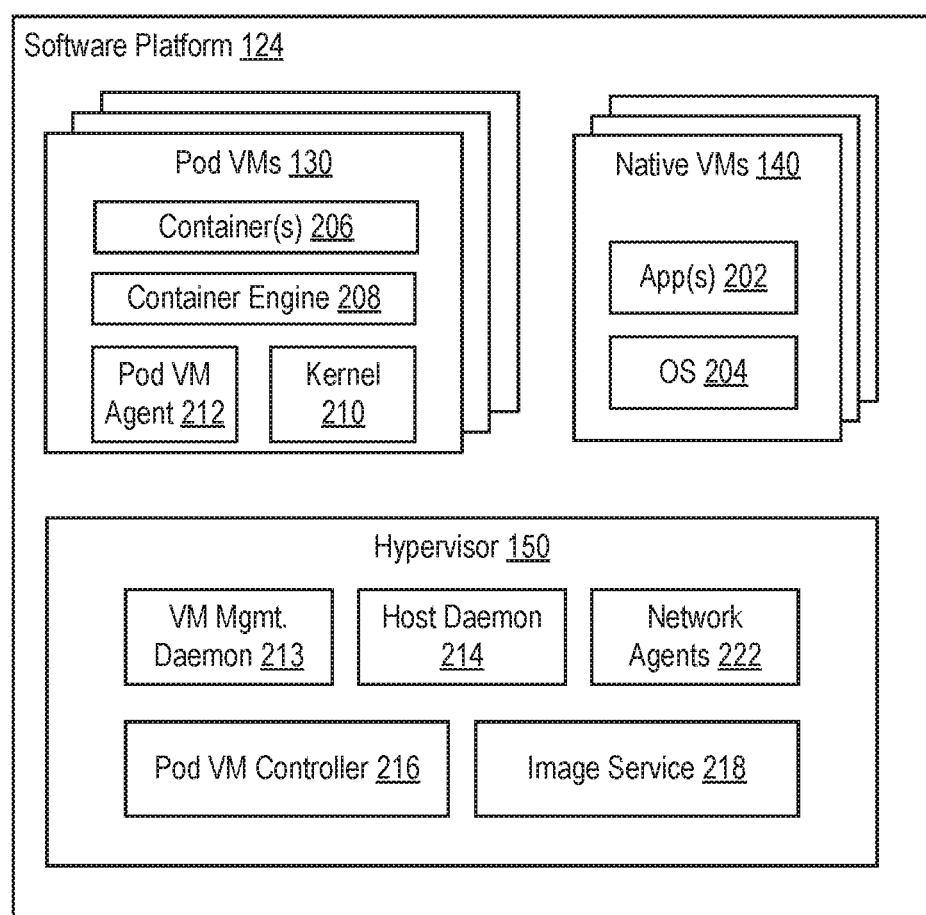
FIG. 2 is a block diagram depicting a software platform according an embodiment.

FIG. 2 is a block diagram depicting software platform 124 according an embodiment. As described above, software platform 124 of host 120 includes hypervisor 150 that supports execution of pod VMs 130 and native VMs 140. In an embodiment, hypervisor 150 includes a VM management daemon 213, a host daemon 214, a pod VM controller 216, an image service 218, and a network agent 222. VM management daemon 213 is a control plane agent 152 of VI control plane 113. VM management daemon 213 provides an interface to host daemon 214 for VM management server 116. Host daemon 214 is configured to create and destroy VMs (e.g., pod VMs 130 and native VMs 140).

Pod VM controller 216 is a control plane agent 152 of orchestration control plane 115 for supervisor cluster 101 and allows Kubernetes master 104 to interact with hypervisor 150. Pod VM controller 216 configures the respective host as a node in orchestration control plane 115. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured.

Image service 218 is configured to download and extract container images to shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images.

Network agent 222 comprises a control plane agent 152 of SD networking 175. Network agent 222 is configured to cooperate with network management and control planes (e.g., network manager 112) to implement logical network resources. Network agent 222 configures the respective host as a transport node in a transport zone managed by network manager 112.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd.

Each of containers 206 has a corresponding container image (CI) stored as a read-only virtual disk in shared storage 170. These read-only virtual disks are referred to herein as CI disks. Additionally, each pod VM 130 has a virtual disk provisioned in shared storage 170 for reads and writes. These read-write virtual disks are referred to herein as ephemeral disks. When a pod VM is deleted, its ephemeral disk is also deleted. In some embodiments, ephemeral disks can be stored on a local storage of a host because they are not shared by different hosts. Container volumes are used to preserve the state of containers beyond their lifetimes. Container volumes are stored in virtual disks of shared storage 170.

Figure 3:
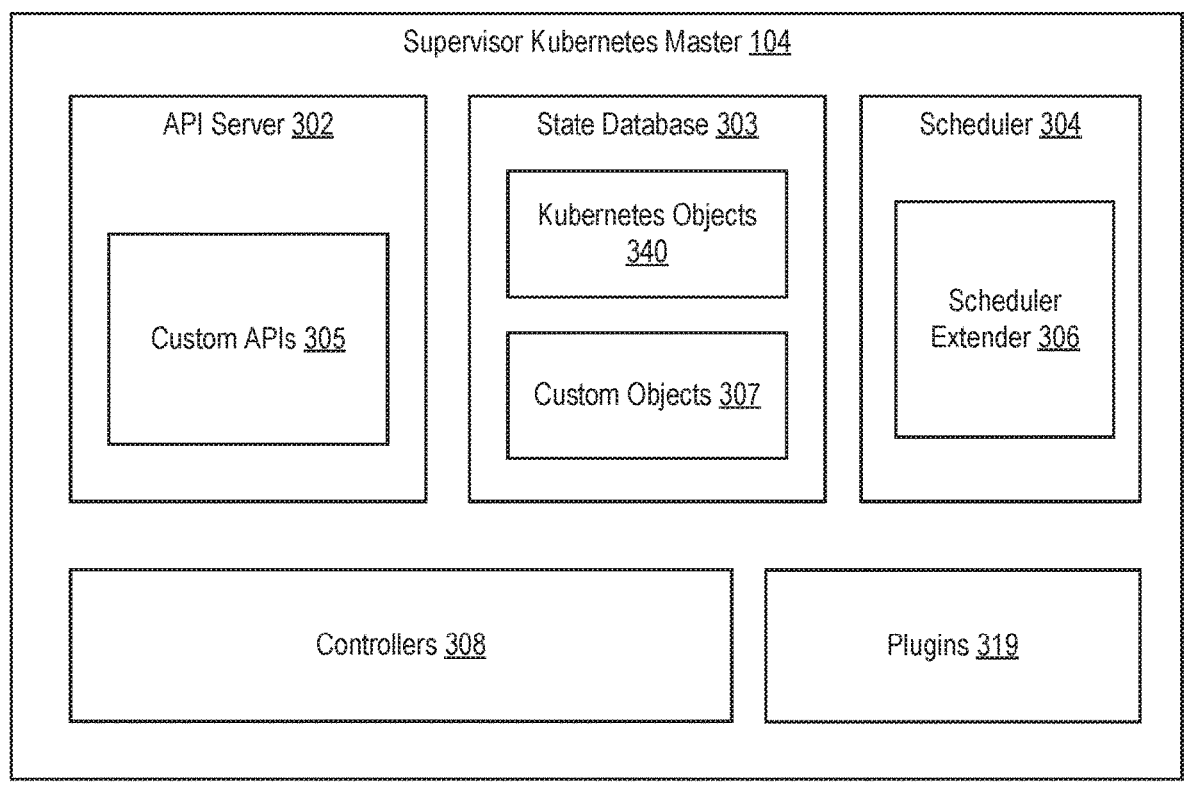
FIG. 3 is a block diagram of a supervisor Kubernetes master according to an embodiment.

FIG. 3 is a block diagram of supervisor Kubernetes master 104 according to an embodiment. Supervisor Kubernetes master 104 includes application programming interface (API) server 302, a state database 303, a scheduler 304, controllers 308, and plugins 319. Controllers 308 can include, for example, standard Kubernetes controllers, as well as custom controllers, such as a VM controller, guest cluster controllers, and platform lifecycle controller (PLC). Plugins 319 can include, for example, a network plugin and a storage plugin.

API server 302 provides an API for use by Kubernetes client 102 (e.g., kube-apiserver). API server 302 is the front end of orchestration control plane 115. The Kubernetes API provides a declarative schema for creating, updating, deleting, and viewing objects. State database 303 stores the state of supervisor cluster 101 (e.g., etcd) as objects created by API server 302. A user can provide application specification data to API server 302 that defines various objects supported by the API (e.g., as a YAML document). The objects have specifications that represent the desired state. State database 303 stores the objects defined by application specification data as part of the supervisor cluster state.

Namespaces provide scope for Kubernetes objects. Namespaces are objects themselves maintained in state database 303. A namespace can include resource quotas, limit ranges, role bindings, and the like that are applied to objects declared within its scope. A VI admin can cooperate with VM management server 116 to define supervisor namespaces for supervisor cluster 101. A supervisor namespace is a resource-constrained and authorization-constrained unit of multi-tenancy managed by VM management server 116. State database 303 stores namespace objects associated with the supervisor namespaces. VM management server 116 creates a namespace object in supervisor Kubernetes master 104 for each supervisor namespace, pushing down resource constraints and authorization constraints into orchestration control plane 115. A namespace is an example of a standard Kubernetes object. State database 303 can store various Kubernetes objects 340, including namespaces.

Scheduler 304 watches state database 303 for newly created pods with no assigned node. A pod is an object supported by API server 302 that is a group of one or more containers, with network and storage, and a specification on how to execute. Scheduler 304 selects candidate nodes in supervisor cluster 101 for pods. Scheduler 304 cooperates with scheduler extender 306, which interfaces with VM management server 116. Scheduler extender 306 cooperates with VM management server 116 (e.g., such as with resource scheduler 108) to select nodes from candidate sets of nodes and provide identities of hosts 120 corresponding to the selected nodes. For each pod, scheduler 304 also converts the pod specification to a pod VM specification, and scheduler extender 306 asks VM management server 116 to reserve a pod VM on the selected host 120. Scheduler 304 updates pods in state database 303 with host identifiers.

A controller 308 tracks objects in state database 303 of at least one resource type. Controller(s) 308 are responsible for making the current state of supervisor cluster 101 come closer to the desired state as stored in state database 303. A controller 308 can carry out action(s) by itself, send messages to API server 302 to have side effects, and/or interact with external systems. A PLC, for example, is responsible for tracking pods that have assigned nodes without pod VM identifiers. The PLC cooperates with VM management server 116 to commit reserved pod VMs for pods. VM management server 116 returns a pod VM identifier to the PLC, which in turn updates the pod in state database 303.

Pods are native objects of Kubernetes. The Kubernetes API can be extended with custom APIs 305 to allow orchestration and management of custom objects 307. A custom resource definition (CRD) can be used to define a custom object 307 to be handled by API server 302. Alternatively, an extension API server can be used to introduce a custom object 307 by API server aggregation, where the extension API server is fully responsible for the custom resource. A user interacts with custom APIs 305 of API server 302 to create custom objects 307 tracked in state database 303. A controller 308 is used to watch for and actuate on custom objects 307 declared in state database 303.

In an embodiment, orchestration control plane 115 is extended to support orchestration of native VMs and guest clusters. This extensibility can be implemented using either CRDs or an extension API server in supervisor Kubernetes master 104. A user or a controller 308 can invoke a custom VM API to create VM objects, which represent native VMs. A user or controller 308 can invoke guest cluster APIs to create objects that represent a guest cluster. Guest cluster objects include objects that represent a Kubernetes cluster, such as: (1) a Cluster object representing an entire Kubernetes cluster and capturing cluster-wide configuration, (2) a Machine object represent each control plane node and each worker node in the Cluster and capturing node-level configuration; (3) a MachineSet set object that maintains a number of identical machine objects representing worker nodes (e.g., similar to a ReplicaSet in Kubernetes); and (4) a MachineDeployment object that manages the rollout strategy for MachineSets (e.g., similar to how Deployment does for ReplicaSet in Kubernetes). These custom guest cluster objects are mapped to VM objects, which represent native VMs on which the guest cluster executes.

Plugins 319 provide a well-defined interface to replace a set of functionality of the Kubernetes control plane. A network plugin is responsible for configuration of logical networking of SD networking 175 to satisfy the needs of network-related resources. A storage plugin 314 is responsible for providing a standardized interface for persistent storage lifecycle and management to satisfy the needs of resources requiring persistent storage.

Figure 4:
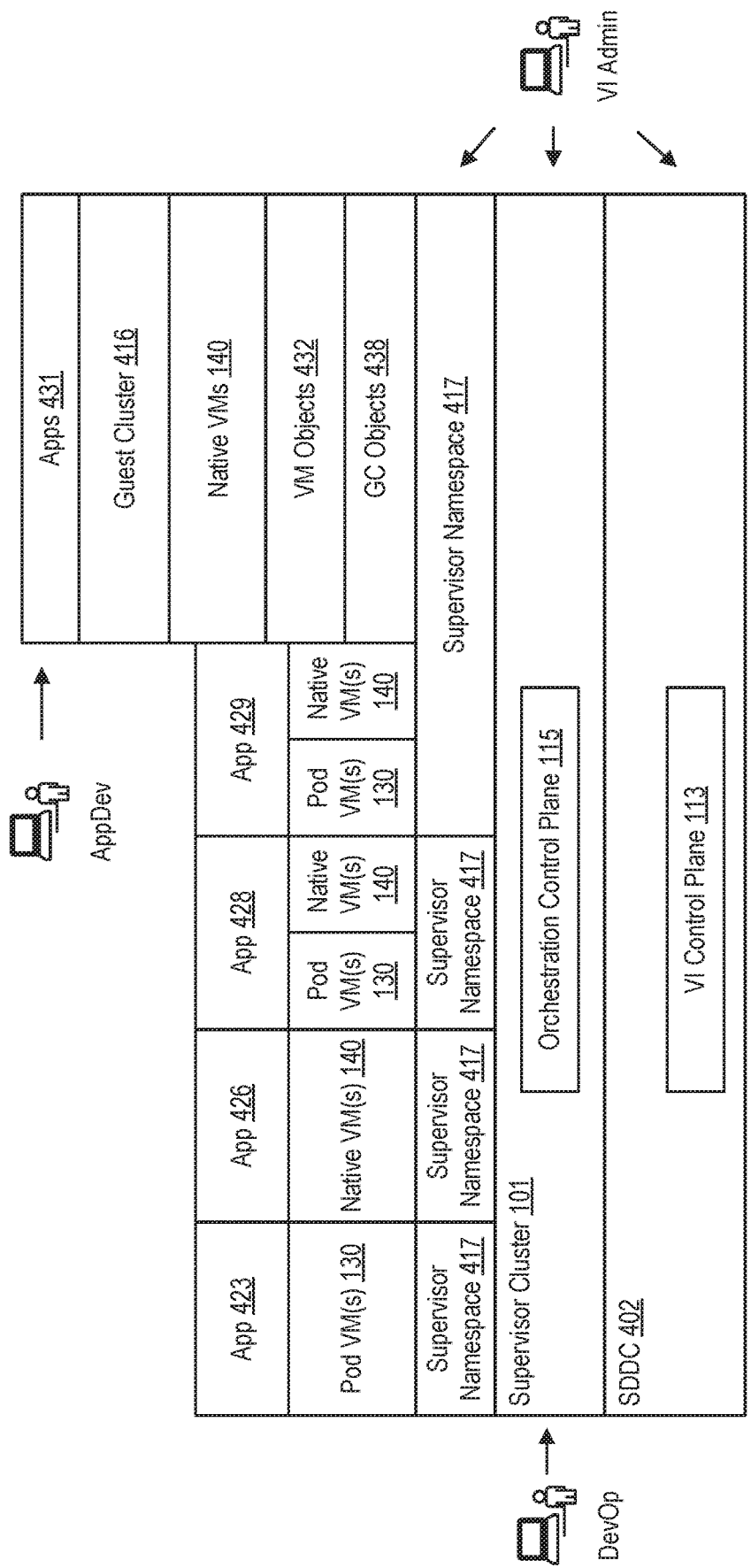
FIG. 4 is a block diagram depicting a guest cluster deployed as a virtual extension of a supervisor cluster alongside other applications according to an embodiment.

FIG. 4 is a block diagram depicting a guest cluster deployed as a virtual extension of a supervisor cluster alongside other applications according to an embodiment. Supervisor cluster 101 is implemented by a software-defined data center (SDDC) 402. SDDC 402 includes virtualized computing system 100 shown in FIG. 1, including host cluster 118, VM management server 116, network manager 112, storage manager 110, shared storage 170, and SD networking 175. SDDC 402 includes VI control plane 113 for managing a virtualization layer of host cluster 118, along with shared storage 170 and SD networking 175. A VI admin interacts with VM management server 116 (and optionally network manager 112) of VI control plane 113 to configure SDDC 402 to implement supervisor cluster 101.

Supervisor cluster 101 includes orchestration control plane 115, which includes supervisor Kubernetes master(s) 104 and pod VM controllers 216. The VI admin interacts with VM management server 116 to create supervisor namespaces 117. Each supervisor namespace 117 includes a resource pool and authorization constraints. The resource pool includes various resource constraints on supervisor namespace 117 (e.g., reservation, limits, and share (RLS) constraints). Authorization constraints provide for which roles are permitted to perform which operations in supervisor namespace 117 (e.g., allowing VI admin to create, manage access, allocate resources, view, and create objects; allowing DevOps to view and create objects; etc.). A DevOp interacts with Kubernetes master 104 to deploy applications on supervisor cluster 101 within scopes of supervisor namespaces 117. In the example, the DevOp deploys an application 423 on pod VM(s) 130, an application 426 on native VM(s) 140, an application 428 on both pod VM(s) 130 and native VM(s) 140, and an application on pod VM(s) 130 and/or native VM(s) 140.

The DevOp also deploys guest cluster 416 on supervisor cluster 101 within a supervisor namespace 117. Guest cluster 416 is constrained by the authorization and resource policy applied by the supervisor namespace in which it is deployed. Guest cluster 416 can be deployed in supervisor namespace 117 along with other applications (e.g., application 429 executing on VM(s) 130/140). Guest cluster 416 supports execution of applications 431. Orchestration control plane 115 is configured to realize guest cluster 416 as a virtual extension of supervisor cluster 101. Orchestration control plane 115 includes GC objects 438 that represent guest cluster 416 and VM objects 432 that represent native VMs 140.

In embodiments, guest cluster 416 is configured to deploy at least some pods as pod VMs 130 executing in supervisor namespace 417. In embodiments, guest cluster 416 can deploy all pods as pod VMs 130 or deploy some pods as pod VMs 130 and some pods in native VMs 140 that implement guest cluster 416. In some embodiments, guest cluster 416 enables the user to select whether pods are deployed within guest cluster 416 or as pod VMs 130 alongside guest cluster 416. In some embodiments, guest cluster 416 can automatically select either pod VMs 130 or guest cluster 416 for implementing pods as they are specified by the user.

Figure 5:
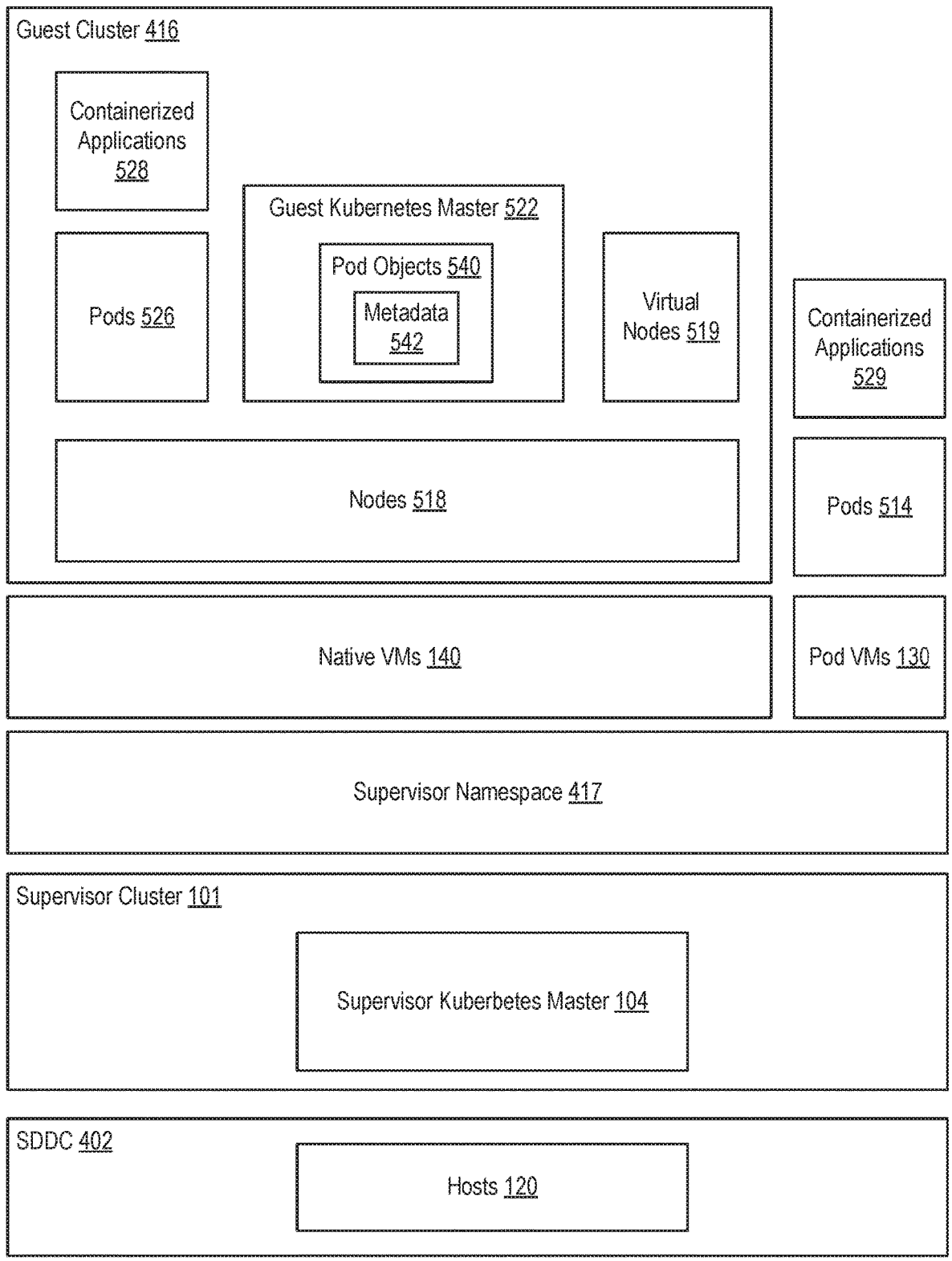
FIG. 5 is a block diagram depicting a guest cluster deployed as a virtual extension of a supervisor cluster according to an embodiment.

FIG. 5 is a block diagram depicting a guest cluster deployed as a virtual extension of a supervisor cluster according to an embodiment. In the embodiment, supervisor cluster 101 is integrated with the virtualization layer of SDDC 402 as described above. Supervisor cluster 101 includes supervisor Kubernetes master 104 and executes on hosts 120 of SDDC 402. Supervisor Kubernetes master 104 manages guest cluster 416 deployed on native VMs 140 in supervisor namespace 417. Guest cluster 416 includes nodes 518, each implemented by a respective native VM 140. Guest cluster 416 includes a guest Kubernetes master 522 executing on one or more nodes 518. A user interacts with guest Kubernetes master 522 to specify pod objects 540 (either directly or as part of other objects, such as deployments). Guest Kubernetes master 522 is configured to deploy specified pods either within guest cluster 416 or on pod VMs 130. For example, guest Kubernetes master 522 can deploy pods 526 on nodes 518 to execute containerized applications 528. Each node 518 includes a guest OS executing on a native VM 140 and a container engine to support containerized applications 528.

Alternatively, guest Kubernetes master 522 can deploy pods to virtual nodes 519. In an embodiment, a virtual node 519 is a process executing on a node 518 in guest cluster 416 that is configured to provide an interface between guest cluster 416 and supervisor cluster 101. When a pod is deployed to a virtual node 519, the virtual node 519 cooperates with supervisor Kubernetes master 104 to deploy the pod to a pod VM 130. In an embodiment, the pod VM executes in supervisor namespace 417 alongside guest cluster 416. In the example shown, guest Kubernetes master 540 deploys pods 514 to pod VMs 130 to execute containerized applications 529 through virtual nodes 519. In an embodiment, each virtual node 519 represents a pod VM 130 and thus guest cluster 416 includes a virtual node for each pod VM 130 used to implement a deployed pod. In another embodiment, each virtual node 519 represents a host 120. Guest Kubernetes master 522 can then deploy multiple pods to a virtual node 519, which in turn deploys the multiple pods to a host 120 as pod VMs 130.

In an embodiment, guest Kubernetes master 522 can automatically deploy pods to pod VMs 130. For example, supervisor Kubernetes master 104 can deploy guest cluster 416 with a quota of pod VMs 130 which can be used for guest cluster pods. Guest Kubernetes master 522 can then deploy pods to pod VMs 130 until reaching the quota. Alternatively, guest Kubernetes master 522 can deploy pods to pod VMs 130 until receiving a deployment failure from supervisor Kubernetes master 104 (e.g., due to lack of resources or consumption of resources beyond a quota). Guest Kubernetes master 522 can then deploy remaining pods within guest cluster 416 (e.g., as pods 526). In an embodiment, a user can request which pods to be deployed as pod VMs 130 using metadata 542 in the pod specification. If metadata 542 requests deployment in pod VMs 130, and if resources are available, guest Kubernetes master 522 deploys the pods as pods VMs. Otherwise, guest Kubernetes master 522 deploys the pods as pods 526 executing in guest cluster 416. If metadata 542 is not specified, guest Kubernetes master 522 can autonomously select to deploy the pods as either pods 526 in guest cluster 416 or pods 514 in pod VMs 130.

Figure 6:
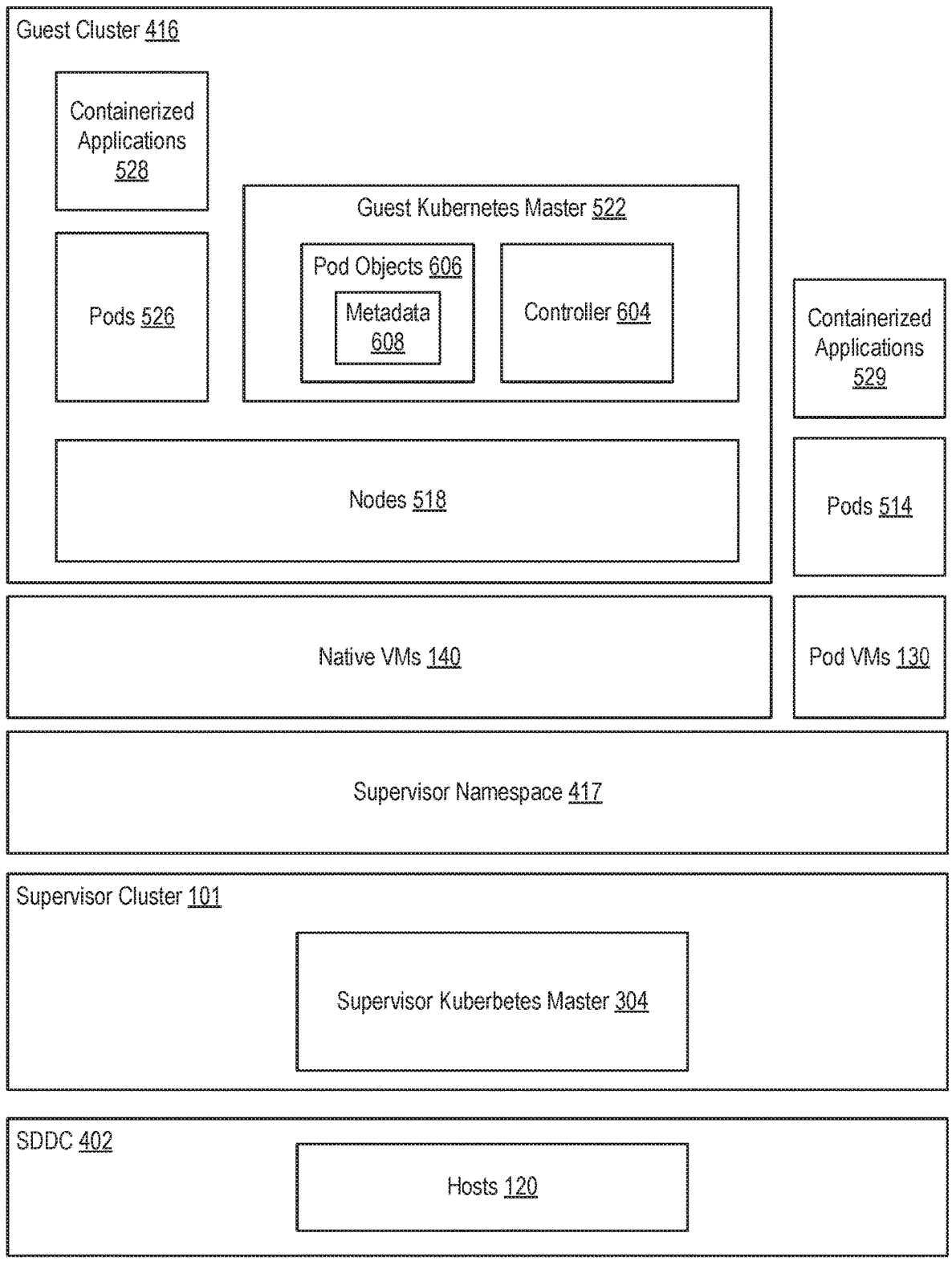
FIG. 6 is a block diagram depicting a guest cluster deployed as a virtual extension of a supervisor cluster according to another embodiment.

FIG. 6 is a block diagram depicting a guest cluster deployed as a virtual extension of a supervisor cluster according to another embodiment. In the embodiment, supervisor cluster 101 is integrated with the virtualization layer of SDDC 402 as described above. Supervisor cluster 101 includes supervisor Kubernetes master 104 and executes on hosts 120 of SDDC 402. Supervisor Kubernetes master 104 manages guest cluster 416 deployed on native VMs 140 in supervisor namespace 417. Guest cluster 416 includes nodes 518, each implemented by a respective native VM 140. Guest cluster 416 includes a guest Kubernetes master 522 executing on one or more nodes 518. A user interacts with guest Kubernetes master 522 to specify pod objects 540 (either directly or as part of other objects, such as deployments). Guest Kubernetes master 522 is configured to deploy specified pods either within guest cluster 416 or on pod VMs 130. For example, guest Kubernetes master 522 can deploy pods 526 on nodes 518 to execute containerized applications 528. Each node 518 includes a guest OS executing on a native VM 140 and a container engine to support containerized applications 528.

Alternatively, guest Kubernetes master 522 can deploy pods to controller 604, which cooperates with supervisor Kubernetes master 104 to deploy the pod to a pod VM 130. In an embodiment, the pod VM executes in supervisor namespace 417 alongside guest cluster 416. In the example shown, guest Kubernetes master 540 deploys pods 514 to pod VMs 130 to execute containerized applications 529 through virtual nodes 519. In an embodiment, controller 604 monitors for pod objects 606. Pod objects 606 can be the standard Kubernetes pod objects that can include metadata 608 specifying a request for pod deployment to a pod VM 130. Controller 604 can monitor for metadata in pod objects 606 and perform pod deployment to pod VMs 130 accordingly. Alternatively, pod objects 606 can be custom objects that are monitored by controller 604. For pod deployment to pod VMs 130, a user specifies the custom pod objects. Otherwise, the user specifies standard Kubernetes pod objects.

Figure 7:
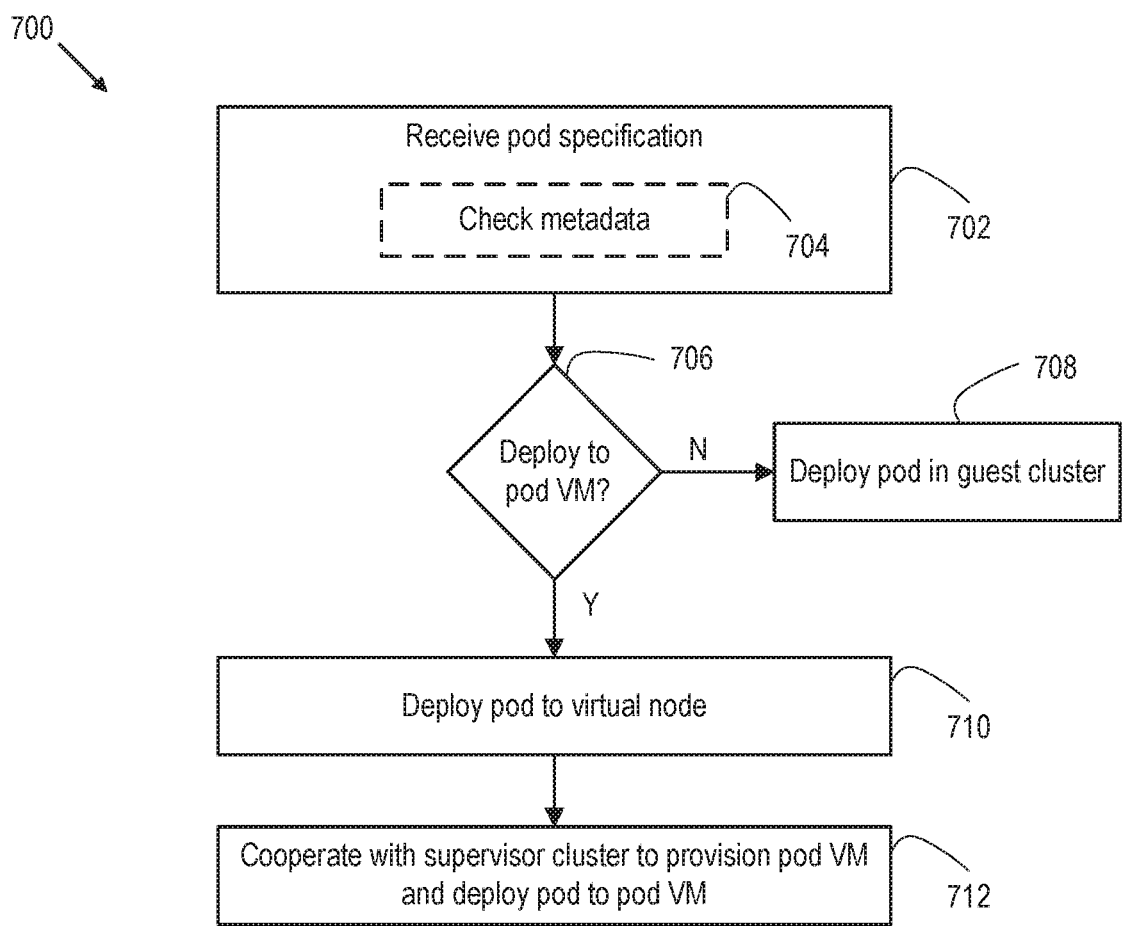
FIG. 7 is a flow diagram showing a method of deploying a pod in a virtualized computing system according to an embodiment.

FIG. 7 is a flow diagram showing a method 700 of deploying a pod in a virtualized computing system according to an embodiment. Method 700 can be performed by software executing in a guest cluster, which comprises software executing on CPU, memory, storage, and network resources managed by a virtualization layer (e.g., a hypervisor). Method 700 can be understood with reference to FIG. 5.

Method 700 starts at step 702, where guest Kubernetes master 522 receives a pod specification from a user. A user can directly specify a pod or can specify another object that includes one or more pods (e.g., a deployment). In some embodiments, the pod or pods can include metadata that indicates whether the user requests the pod(s) to be deployed on pod VM(s) 130 of supervisor cluster 101. In such case, at step 704, guest Kubernetes master 522 checks for metadata in the pod specification.

At step 706, guest Kubernetes master 522 determines whether to deploy the pod to a pod VM 130. If not, method 700 proceeds to step 708, where guest Kubernetes master 522 deploys the pod in guest cluster 516 (e.g., as a pod 526). Otherwise, method 700 proceeds to step 710, where guest Kubernetes master 522 deploys the pod to a virtual node 519. At step 712, virtual node 519 cooperates with supervisor Kubernetes master 104 to provision a pod VM 130 and deploy the pod to pod VM 130. At step 706, guest Kubernetes master 104 can examine the metadata to determine whether the pod is requested to be deployed to a pod VM 130. In such case, guest Kubernetes master 104 will attempt to deploy the pod to a pod VM 130. Otherwise, guest Kubernetes master 104 can deploy the pod as either a pod 526 in guest cluster 416 or as a pod 514 in a pod VM 130. In some embodiments, metadata is not used and guest Kubernetes master 522 autonomously determines whether to deploy the pod to a pod VM 130. For example, supervisor cluster 101 may dedicate a quota of pod VMs 130 for use by guest cluster 416 as discussed above.

Figure 8:
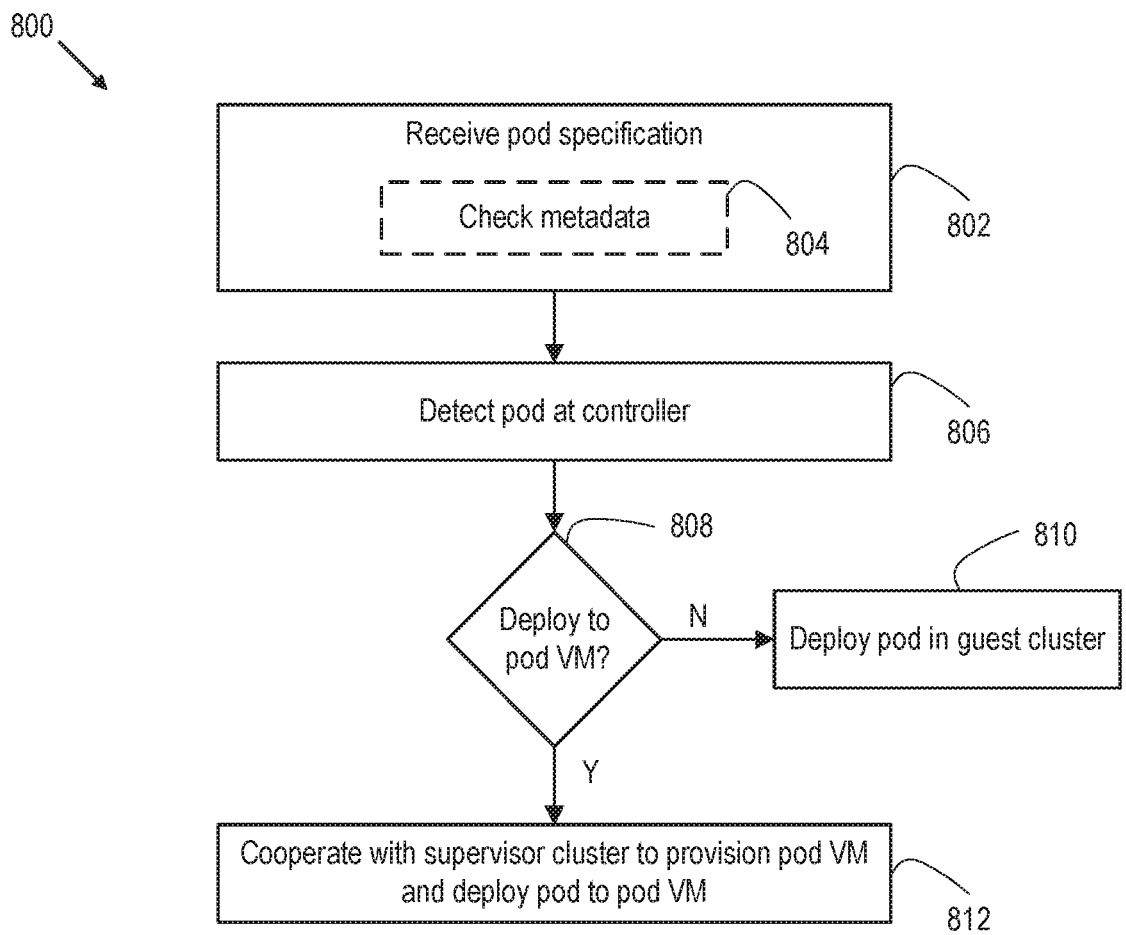
FIG. 8 is a flow diagram showing a method of deploying a pod in a virtualized computing system according to an embodiment.

FIG. 8 is a flow diagram showing a method 800 of deploying a pod in a virtualized computing system according to an embodiment. Method 800 can be performed by software executing in a guest cluster, which comprises software executing on CPU, memory, storage, and network resources managed by a virtualization layer (e.g., a hypervisor). Method 800 can be understood with reference to FIG. 6.

Method 800 starts at step 802, where guest Kubernetes master 522 receives a pod specification from a user. A user can directly specify a pod or can specify another object that includes one or more pods (e.g., a deployment). In some embodiments, the pod or pods can include metadata that indicates whether the user requests the pod(s) to be deployed on pod VM(s) 130 of supervisor cluster 101. In such case, at step 704, guest Kubernetes master 522 checks for metadata in the pod specification. In some embodiments, the pod specification can specify a standard Kubernetes pod (e.g., with or without metadata). In another embodiment, the pod specification can specify a custom pod intended to be deployed to a pod VM 130.

At step 806, controller 604 detects the pod object as created according to the pod specification. In an embodiment, controller 604 detects presence of metadata in a standard Kubernetes pod object. Alternatively, controller 604 detects specification of a custom pod object. In yet another alternative, the user can specific a standard Kubernetes pod without metadata.

At step 808, controller 604 determines whether to deploy the pod to a pod NVM 130. If not, method 800 proceeds to step 810, where controller 806 deploys the pod as a pod 526 executing in guest cluster 416. Otherwise, method 800 proceeds to step 812, where controller 604 cooperates with supervisor Kubernetes master 104 to provision a pod VM 130 and deploy the pod as a pod 514 executing in pod VM 130. Controller 604 determines whether to deploy pod to a pod VM 130 based on the absence/presence of metadata in a standard Kubernetes pod object, or the absence/presence of a custom pod object.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A virtualized computing system, comprising:
   a host cluster having hosts and a virtualization layer executing on hardware platforms of the hosts, the virtualization layer supporting execution of virtual machines (VMs);
   an orchestration control plane of a supervisor cluster, the orchestration control plane integrated with the virtualization layer and including a master server, the master server configured to manage the hosts as nodes of the supervisor cluster, and manage pod VMs and native VMs of the VMs, the pod VMs including container engines supporting execution of containers therein; and
   a guest cluster executing in the native VMs and managed by the master server, the guest cluster including a guest master server configured to manage the native VMs as nodes of the guest cluster, the guest master server configured to, in cooperation with the master server, deploy first pods in the pod VMs, the first pods executing first containers.

2. The virtualized computing system of claim 1, wherein the guest master server is configured to deploy second pods in the nodes of the guest cluster, the second pods executing second containers.

3. The virtualized computing system of claim 2, wherein the guest master server is configured to receive a first specification for the first pods and a second specification for the second pods, the first specification including metadata requesting the first pods be deployed to the pod VMs.

4. The virtualized computing system of claim 3, wherein the second specification excludes any metadata requesting the second pods be deployed to the pod VMs.

5. The virtualized computing system of claim 1, wherein the guest cluster is configured to execute a virtual node in the native VMs, the virtual node representing a first host of the hosts, and wherein the guest master server is configured to deploy the first pods to the virtual node, which in turn cooperates with the master server to deploy the first pods in the pod VMs on the first host.

6. The virtualized computing system of claim 1, wherein the guest cluster is configured to execute virtual nodes in the native VMs, the virtual nodes representing the pod VMs, and wherein the guest master server is configured to deploy the first pods to the virtual nodes, which in turn cooperate with the master server to deploy the first pods in the pod VMs.

7. The virtualized computing system of claim 1, wherein the guest cluster is configured to execute a controller, the controller configured to detect specification of the first pods received by the master server and configured to cooperate with the master server to deploy the first pods to the pod VMs.

8. A method of deploying first pods in a virtualized computing system, the virtualized computing system including a host cluster having hosts and a virtualization layer executing on hardware platforms of the hosts, the virtualization layer supporting execution of virtual machines (VMs), the method comprising:
   receiving a first specification of the first pods at a guest master server of a guest cluster executing in native VMs of the VMs and managed by an orchestration control plane of a supervisor cluster, the guest master server configured to manage the native VMs as nodes of the guest cluster the orchestration control plane integrated with the virtualization layer and including a master server, the master server configured to manage the hosts as nodes of the supervisor cluster, and manage pod VMs, the first native VMs, and the guest cluster, the pod VMs including container engines supporting execution of containers therein; and
   deploying, by the guest master server in cooperation with the master server, the first pods in the pod VMs, the first pods executing first containers.

9. The method of claim 8, further comprising:
   deploying, by the guest master server, second pods in the native VMs.

10. The method of claim 9, wherein the first specification includes metadata requesting the first pods be deployed to the pod VMs.

11. The method of claim 10, further comprising:
    receiving, at the guest master server, a second specification for the second pods;
    wherein the second specification excludes any metadata requesting the second pods be deployed to the pod VMs.

12. The method of claim 8, wherein the guest cluster is configured to execute a virtual node in the native VMs, the virtual node representing a first host of the hosts, and wherein the step of deploying comprises deploying, by the guest master server, the first pods to the virtual node, which in turn cooperates with the master server to deploy the first pods in the pod VMs on the first host.

13. The method of claim 8, wherein the guest cluster is configured to execute virtual nodes in the native VMs, the virtual nodes representing the pod VMs, and wherein the step of deploying comprises deploying, by the guest master server, the first pods to the virtual nodes, which in turn cooperate with the master server to deploy the first pods in the pod VMs.

14. The method of claim 8, wherein the guest cluster is configured to execute a controller, the controller configured to detect specification of the first pods received by the master server, and wherein the step of deploying comprises the controller cooperating with the master server to deploy the first pods to the pod VMs.

15. A non-transitory computer readable medium comprising instructions to be executed in a computing device to cause the computing device to carry out a method of a method of deploying first pods in a virtualized computing system, the virtualized computing system including a host cluster having hosts and a virtualization layer executing on hardware platforms of the hosts, the virtualization layer supporting execution of virtual machines (VMs), the method comprising:
   receiving a first specification of the first pods at a guest master server of a guest cluster executing in native VMs of the VMs and managed by an orchestration control plane of a supervisor cluster, the guest master server configured to manage the native VMs as nodes of the guest cluster the orchestration control plane integrated with the virtualization layer and including a master server, the master server configured to manage the hosts as nodes of the supervisor cluster, and manage pod VMs, the first native VMs, and the guest cluster, the pod VMs including container engines supporting execution of containers therein; and deploying, by the guest master server in cooperation with the master server, the first pods in the pod VMs, the first pods executing first containers.

16. The non-transitory computer readable medium of claim 15, further comprising:

deploying, by the guest master server, second pods in the native VMs.

17. The non-transitory computer readable medium of claim 16 wherein the first specification includes metadata requesting the first pods be deployed to the pod VMs.

18. The non-transitory computer readable medium of claim 15, wherein the guest cluster is configured to execute a virtual node in the native VMs, the virtual node representing a first host of the hosts, and wherein the step of deploying comprises deploying, by the guest master server, the first pods to the virtual node, which in turn cooperates with the master server to deploy the first pods in the pod VMs on the first host.

19. The non-transitory computer readable medium of claim 15, wherein the guest cluster is configured to execute virtual nodes in the native VMs, the virtual nodes representing the pod VMs, and wherein the step of deploying comprises deploying, by the guest master server, the first pods to the virtual nodes, which in turn cooperate with the master server to deploy the first pods in the pod VMs.

20. The non-transitory computer readable medium of claim 15, wherein the guest cluster is configured to execute a controller, the controller configured to detect specification of the first pods received by the master server, and wherein the step of deploying comprises the controller cooperating with the master server to deploy the first pods to the pod VMs.

* * * * *